US012772231B2

(12) United States Patent
Zorgui et al.

(10) Patent No.: US 12,772,231 B2
(45) Date of Patent: Oct. 20, 2026

(54) TECHNIQUES FOR ADAPTIVE CONFIGURED COMMUNICATION FOR NETWORK ENERGY SAVING OPERATIONS

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 570 days.

(21) Appl. No.: 18/057,981

(22) Filed: Nov. 22, 2022

(65) Prior Publication Data

US 2024/0172214 A1 May 23, 2024

(51) Int. Cl.

| | |
|---|---|
| ***H04W 72/1263*** | (2023.01) |
| ***H04L 1/00*** | (2006.01) |
| ***H04W 52/02*** | (2009.01) |
| ***H04W 72/23*** | (2023.01) |

(52) U.S. Cl.

CPC ....... *H04W 72/1263* (2013.01); *H04L 1/0003* (2013.01); *H04W 52/0203* (2013.01); *H04W 72/23* (2023.01)

(58) Field of Classification Search

None

See application file for complete search history.

(56) References Cited

U.S. PATENT DOCUMENTS

| | | | | |
|---|---|---|---|---|
| 12,069,626 B2 * | 8/2024 | Nam | | H04L 5/0091 |
| 2015/0223165 A1 * | 8/2015 | Xu | | H04W 52/0212 370/311 |
| 2019/0261395 A1 * | 8/2019 | Goektepe | | H04W 36/0033 |
| 2020/0022174 A1 * | 1/2020 | Karaki | | H04W 72/0453 |
| 2020/0053756 A1 * | 2/2020 | Sun | | H04W 72/23 |
| 2020/0153666 A1 * | 5/2020 | Khoshnevisan | | H04B 7/024 |

(Continued)

FOREIGN PATENT DOCUMENTS

WO 2022109146 A1 5/2022

OTHER PUBLICATIONS

International Search Report and Written Opinion—PCT/US2023/078061—ISA/EPO—Mar. 14, 2024.

(Continued)

*Primary Examiner* — Wutchung Chu
*Assistant Examiner* — Berhanu D Belete
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive a configuration for semi-persistent scheduling (SPS) or a configured grant (CG), the configuration indicating a first set of parameters, of the SPS or the CG, for a first state of a first transmission reception point (TRP) and a second set of parameters, of the SPS or the CG, for a second state of the first TRP, and the configuration including information indicating that the first set of parameters and the second set of parameters are for the first TRP. The UE may communicate with the first TRP in accordance with the configuration. Numerous other aspects are described.

30 Claims, 13 Drawing Sheets

(56) References Cited

U.S. PATENT DOCUMENTS

| | | | | |
|---|---|---|---|---|
| 2020/0229100 | A1* | 7/2020 | He | H04W 80/02 |
| 2020/0322939 | A1* | 10/2020 | Cao | H04W 72/02 |
| 2020/0396760 | A1* | 12/2020 | Yi | H04L 1/1812 |
| 2020/0404632 | A1* | 12/2020 | Zhou | H04W 72/23 |
| 2021/0068100 | A1* | 3/2021 | Takeda | H04W 72/23 |
| 2021/0084596 | A1* | 3/2021 | Lee | H04W 52/146 |
| 2021/0084639 | A1* | 3/2021 | Höglund | H04W 72/51 |
| 2021/0100001 | A1* | 4/2021 | Höglund | H04L 5/0053 |
| 2021/0204313 | A1* | 7/2021 | Takeda | H04W 72/115 |
| 2021/0227513 | A1* | 7/2021 | Takeda | H04L 5/0053 |
| 2021/0266932 | A1* | 8/2021 | Liu | H04W 72/535 |
| 2022/0015034 | A1* | 1/2022 | Miao | H04W 52/0212 |
| 2022/0095224 | A1* | 3/2022 | Kim | H04L 1/0009 |
| 2022/0408361 | A1* | 12/2022 | Yang | H04W 52/0229 |
| 2023/0014238 | A1* | 1/2023 | Pocovi | H04W 72/1263 |
| 2023/0309171 | A1* | 9/2023 | Zhou | H04W 72/23 |
| 2024/0064616 | A1* | 2/2024 | Hasanzadezonuzy | H04W 16/28 |
| 2024/0064854 | A1* | 2/2024 | Hasanzadezonuzy | H04B 7/0695 |
| 2024/0340796 | A1* | 10/2024 | Zhou | H04L 1/0027 |
| 2024/0357526 | A1* | 10/2024 | Zhou | H04W 76/20 |
| 2025/0048259 | A1* | 2/2025 | Liu | H04W 52/0258 |
| 2025/0126553 | A1* | 4/2025 | Fu | H04W 52/0203 |

OTHER PUBLICATIONS

NTT Docomo, Inc: “Enhanced UL Transmission with Configured Grant for URLIC”, 3GPP TSG RAN WG1 #97, R1-1906216, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019 , May 4, 2019, XP051727670, 10 Pages.

* cited by examiner

TECHNIQUES FOR ADAPTIVE CONFIGURED COMMUNICATION FOR NETWORK ENERGY SAVING OPERATIONS

FIELD OF THE DISCLOSURE

Aspects of the present disclosure generally relate to wireless communication and to techniques and apparatuses for adaptive configured communication for network energy saving operations.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving a configuration for semi-persistent scheduling (SPS) or a configured grant (CG), the configuration indicating a first set of parameters, of the SPS or the CG, for a first state of a first transmission reception point (TRP) and a second set of parameters, of the SPS or the CG, for a second state of the first TRP, and the configuration including information indicating that the first set of parameters and the second set of parameters are for the first TRP. The method may include communicating with the first TRP in accordance with the configuration.

Some aspects described herein relate to a method of wireless communication performed by a network node. The method may include outputting a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The method may include communicating in accordance with the configuration.

Some aspects described herein relate to a UE for wireless communication. The UE may include a memory and one or more processors coupled to the memory. The one or more processors may be configured to receive a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The one or more processors may be configured to communicate with the first TRP in accordance with the configuration.

Some aspects described herein relate to a network node for wireless communication. The network node may include a memory and one or more processors coupled to the memory. The one or more processors may be configured to output a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The one or more processors may be configured to communicate in accordance with the configuration.

Some aspects described herein relate to a non-transitory computer-readable medium that stores a set of instructions for wireless communication by a UE. The set of instructions, when executed by one or more processors of the UE, may cause the UE to receive a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The set of instructions, when executed by one or more processors of the UE, may cause the UE to communicate with the first TRP in accordance with the configuration.

Some aspects described herein relate to a non-transitory computer-readable medium that stores a set of instructions for wireless communication by a network node. The set of instructions, when executed by one or more processors of the network node, may cause the network node to output a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The set of instructions, when executed by one or more processors of the network node, may cause the network node to communicate in accordance with the configuration.

Some aspects described herein relate to an apparatus for wireless communication. The apparatus may include means for receiving a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The apparatus may include means for communicating with the first TRP in accordance with the configuration.

Some aspects described herein relate to an apparatus for wireless communication. The apparatus may include means for outputting a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The apparatus may include means for communicating in accordance with the configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
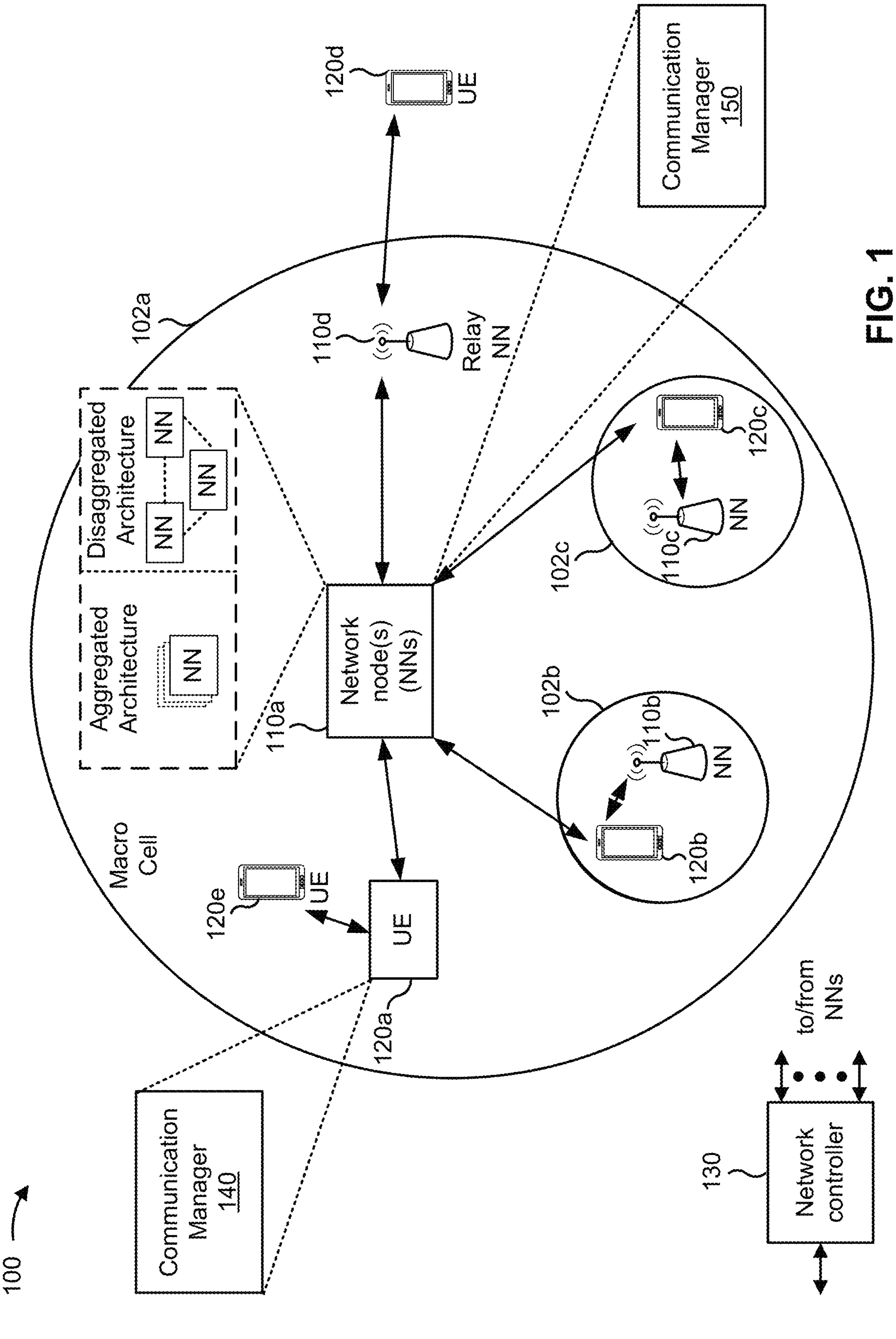
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing 284 that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term “sub-6 GHz,” if used herein, may broadly represent frequencies that may be less than 6 GHz, may be within FR1, or may include mid-band frequencies. Further, unless specifically stated otherwise, the term “millimeter wave,” if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP; and communicate with the first TRP in accordance with the configuration. Additionally, or alternatively, the communication manager 140 may perform one or more other operations described herein.

In some aspects, the network node 110 may include a communication manager 150. As described in more detail elsewhere herein, the communication manager 150 may output a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP; and communicate in accordance with the configuration. Additionally, or alternatively, the communication manager 150 may perform one or more other operations described herein.

As indicated above, FIG. 1 is provided as an example. Other examples may differ from what is described with regard to FIG. 1.

Figure 2:
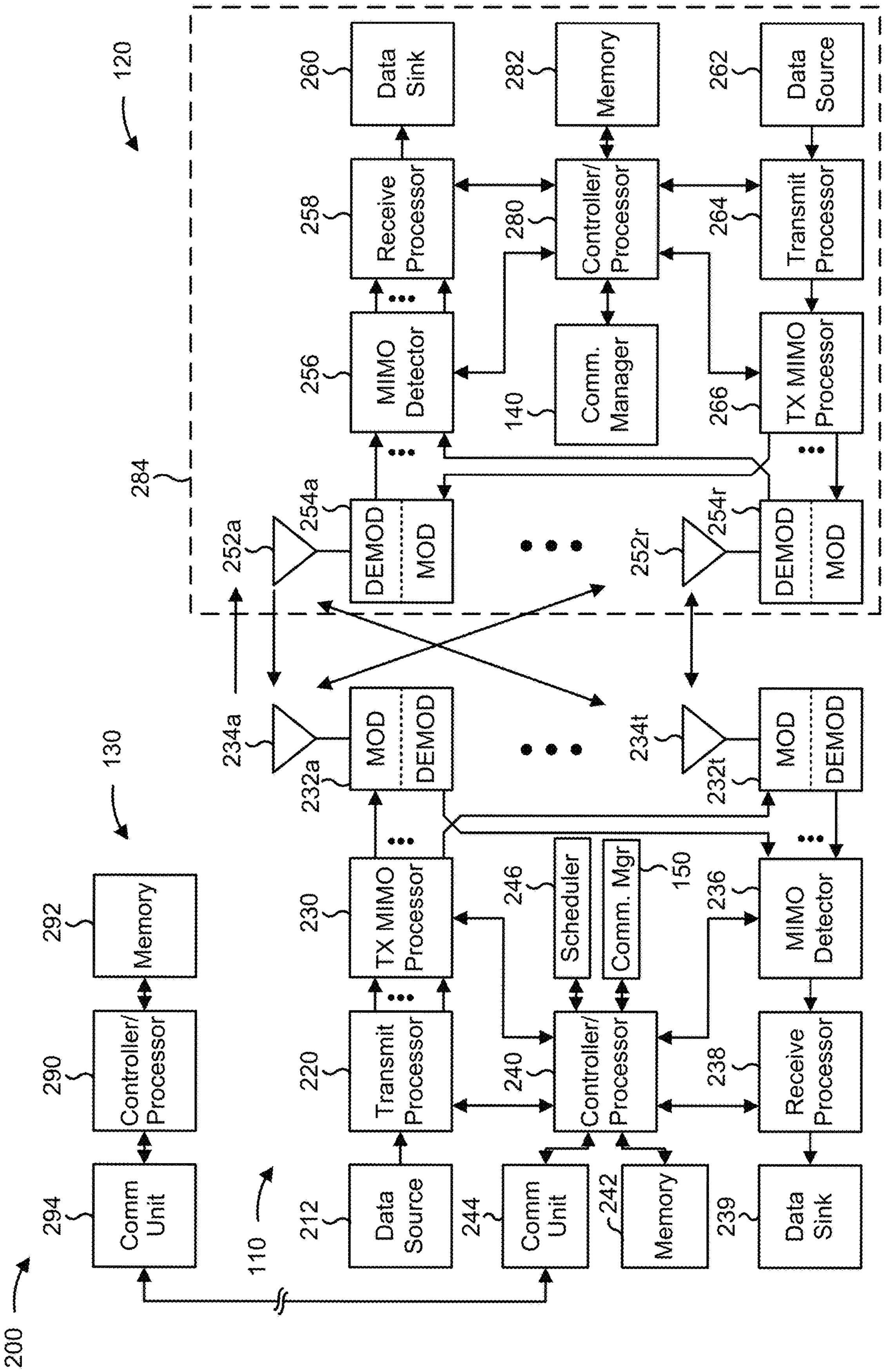
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-13).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-13).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with network energy savings, as described in more detail elsewhere herein. For example, the controller/processor 240 of the network node 110, the controller/processor 280 of the UE 120, or any other component(s) (or combinations of components) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP; and/or means for communicating with the first TRP in accordance with the configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for outputting a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP; and/or means for communicating in accordance with the configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
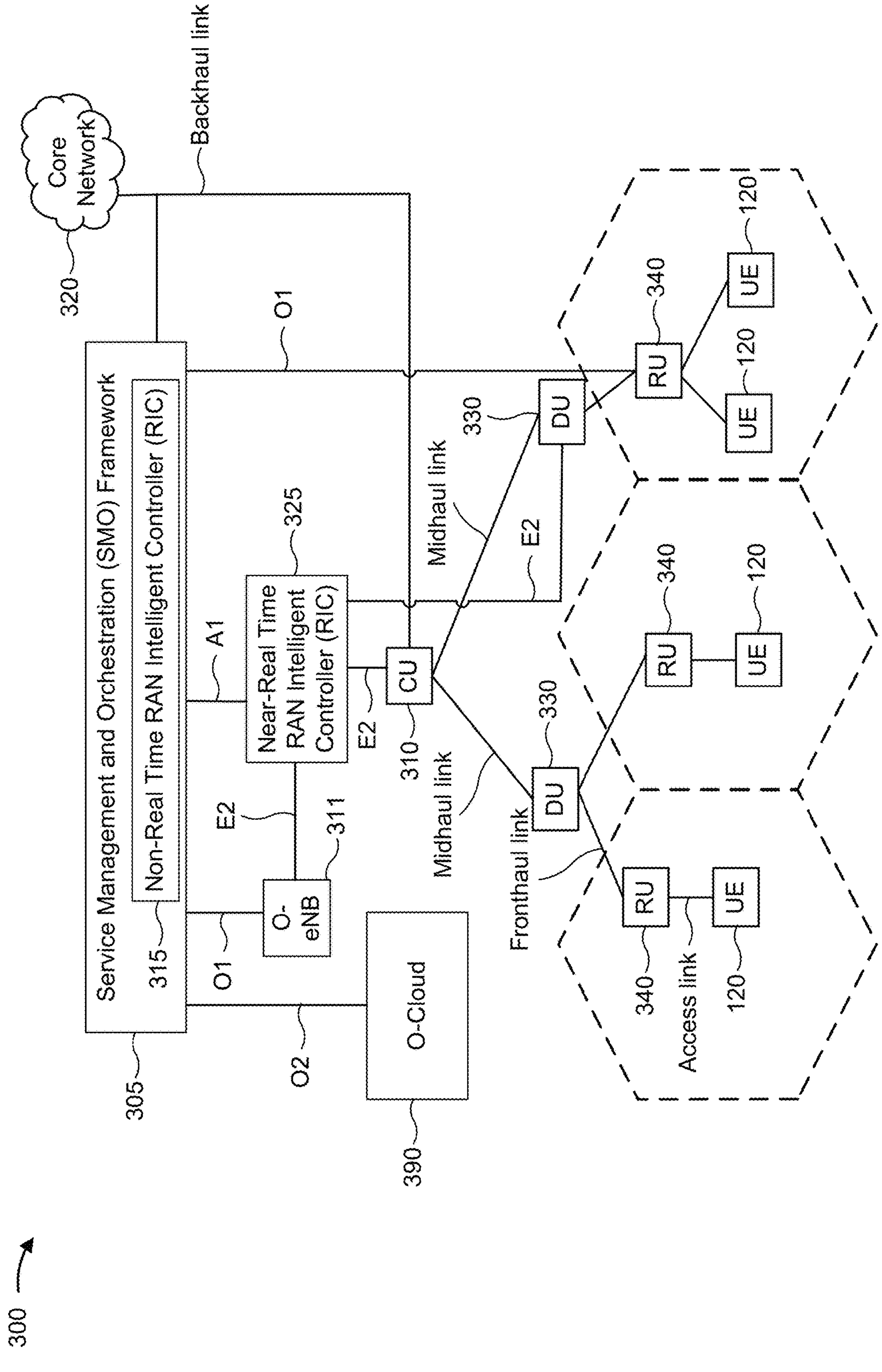
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
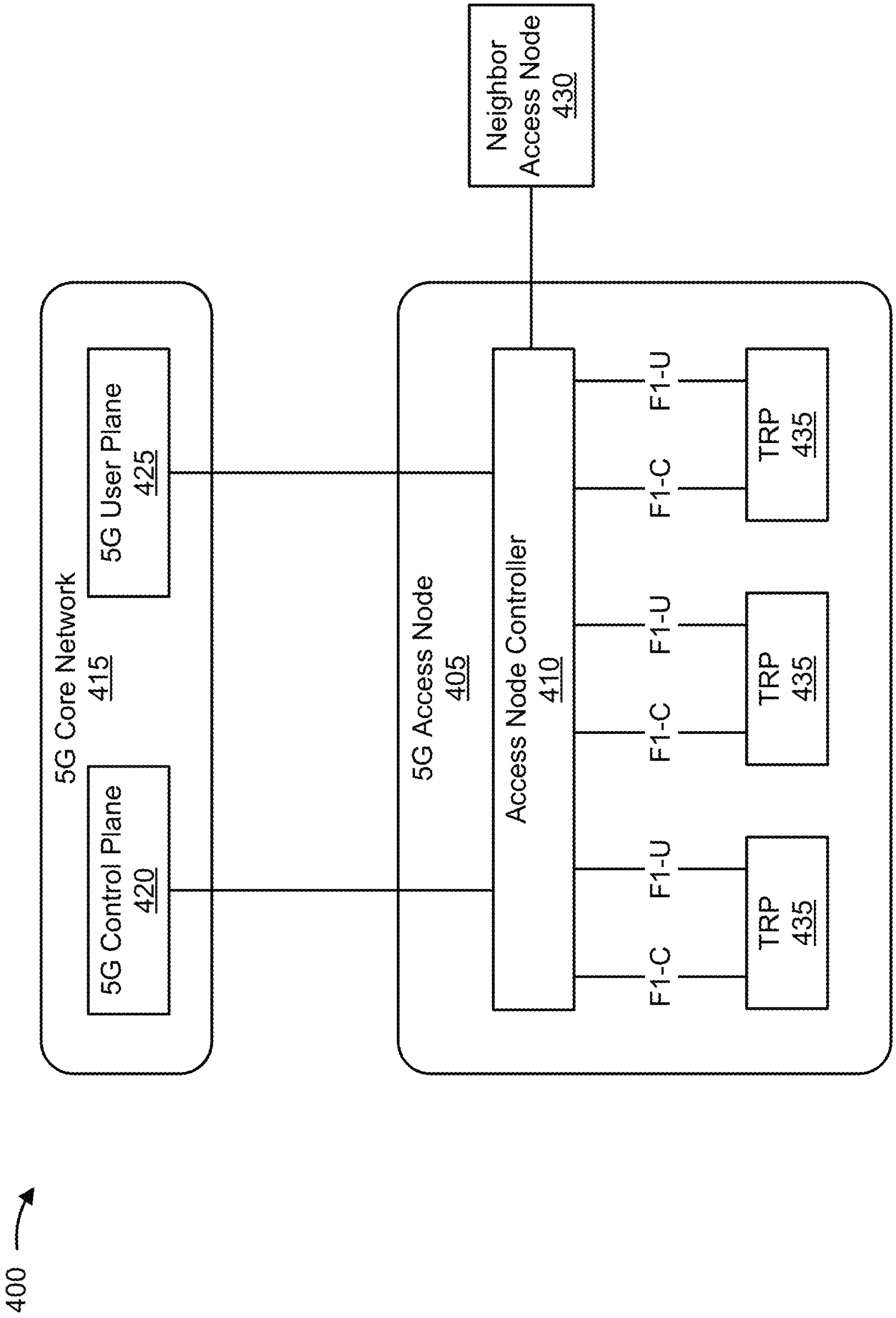
FIG. 4 illustrates an example logical architecture of a distributed radio access network (RAN), in accordance with the present disclosure.

FIG. 4 illustrates an example logical architecture of a distributed RAN 400, in accordance with the present disclosure.

A 5G access node 405 may include an access node controller 410. The access node controller 410 may be a central unit (CU) of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may include a distributed unit (DU) and/or a radio unit (RU) of the distributed RAN 400. In some aspects, a TRP 435 may correspond to a network node 110 described above in connection with FIG. 1. For example, different TRPs 435 may be included in different network nodes 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400, referred to elsewhere herein as a functional split. For example, a packet data convergence protocol (PDCP) layer, a radio link control (RLC) layer, and/or a medium access control (MAC) layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
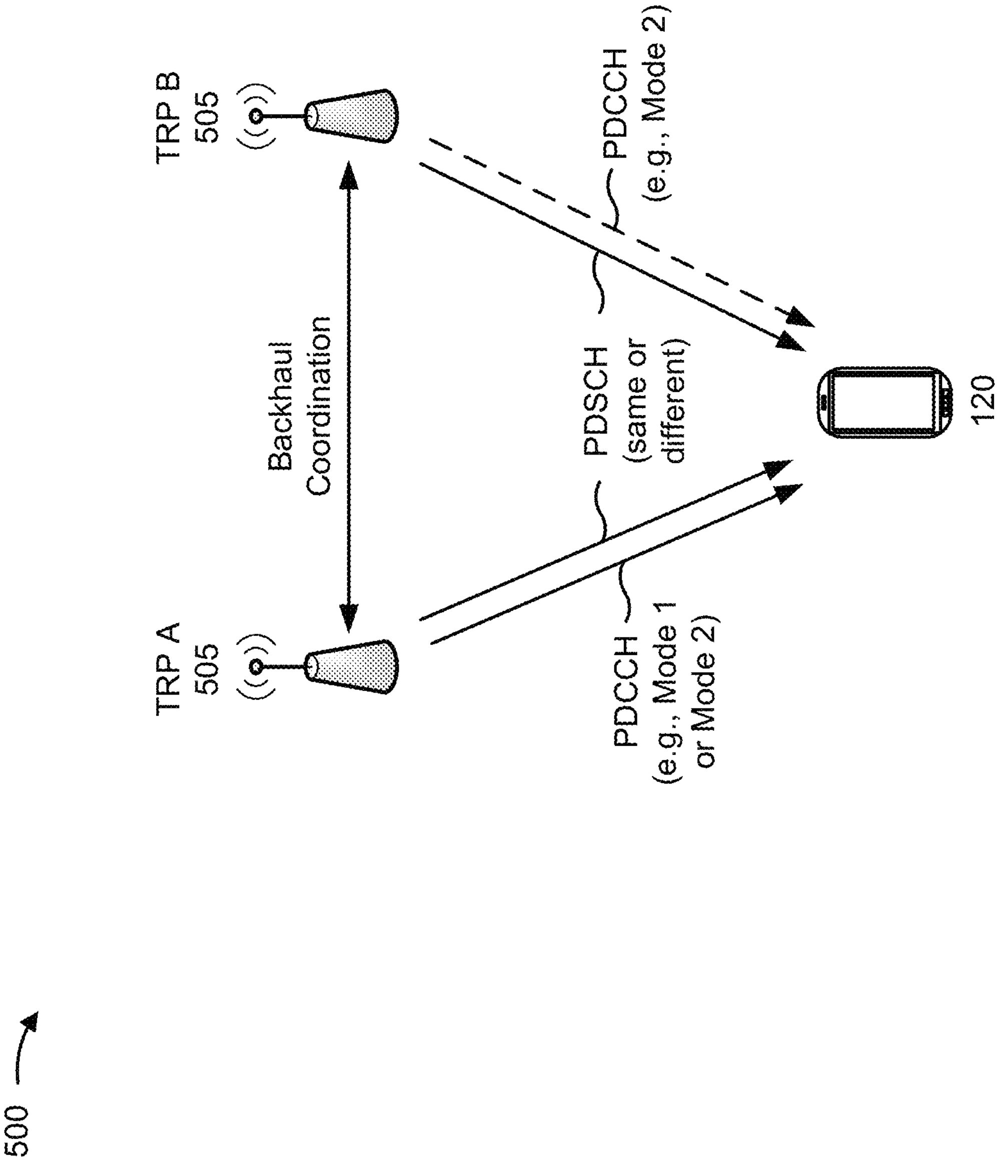
FIG. 5 is a diagram illustrating an example of multiple transmission reception point (TRP) communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same network node 110 (e.g., when the TRPs 505 are different antenna arrays or panels of the same network node 110), and may have a larger delay and/or lower capacity (as compared to co-location) when the TRPs 505 are located at different network nodes 110. The different TRPs 505 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
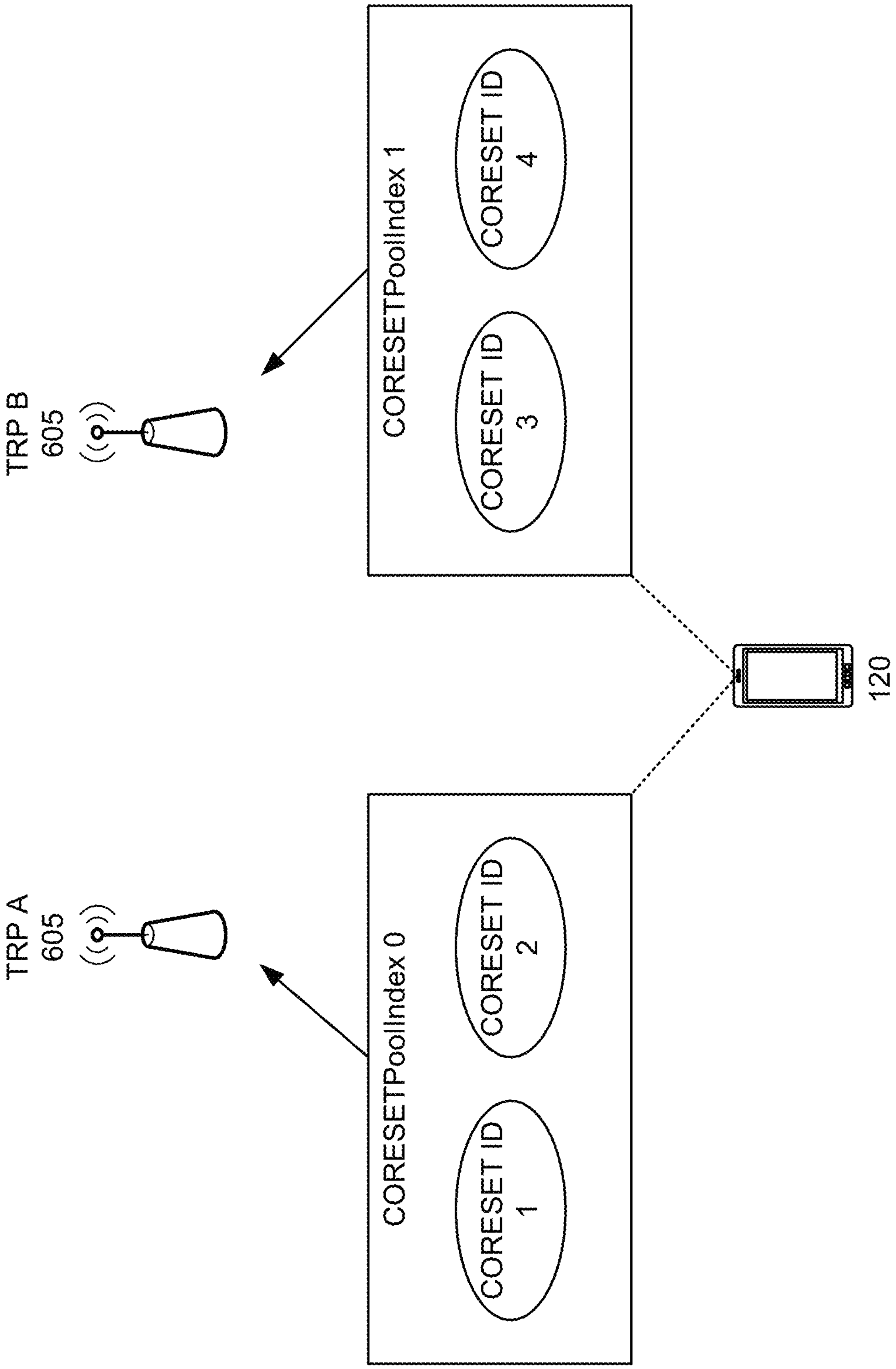
FIG. 6 is a diagram illustrating an example of TRP differentiation at a UE based at least in part on a control resource set pool index, in accordance with the present disclosure.

FIG. 6 is a diagram illustrating an example of TRP differentiation at a UE based at least in part on a CORESET pool index, in accordance with the present disclosure. In some aspects, a CORESET pool index (or CORESETPoolIndex) value may be used by a UE (a UE 120) to identify a TRP associated with an uplink grant received on a PDCCH.

A CORESET may refer to a control region that is structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using radio resource control (RRC) signaling to indicate a frequency domain region (for example, a quantity of resource blocks) or a time domain region (for example, a quantity of symbols) for the CORESET.

As illustrated in FIG. 6, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 6, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 605. As an example, and as illustrated in FIG. 6, a first TRP 605 (TRP A) (or a first network node 100) may be associated with CORESET pool index 0 and a second TRP 605 (TRP B) (or a second network node 110) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

As indicated above, FIG. 6 is provided as an example. Other examples may differ from what is described with respect to FIG. 6.

Figure 7:
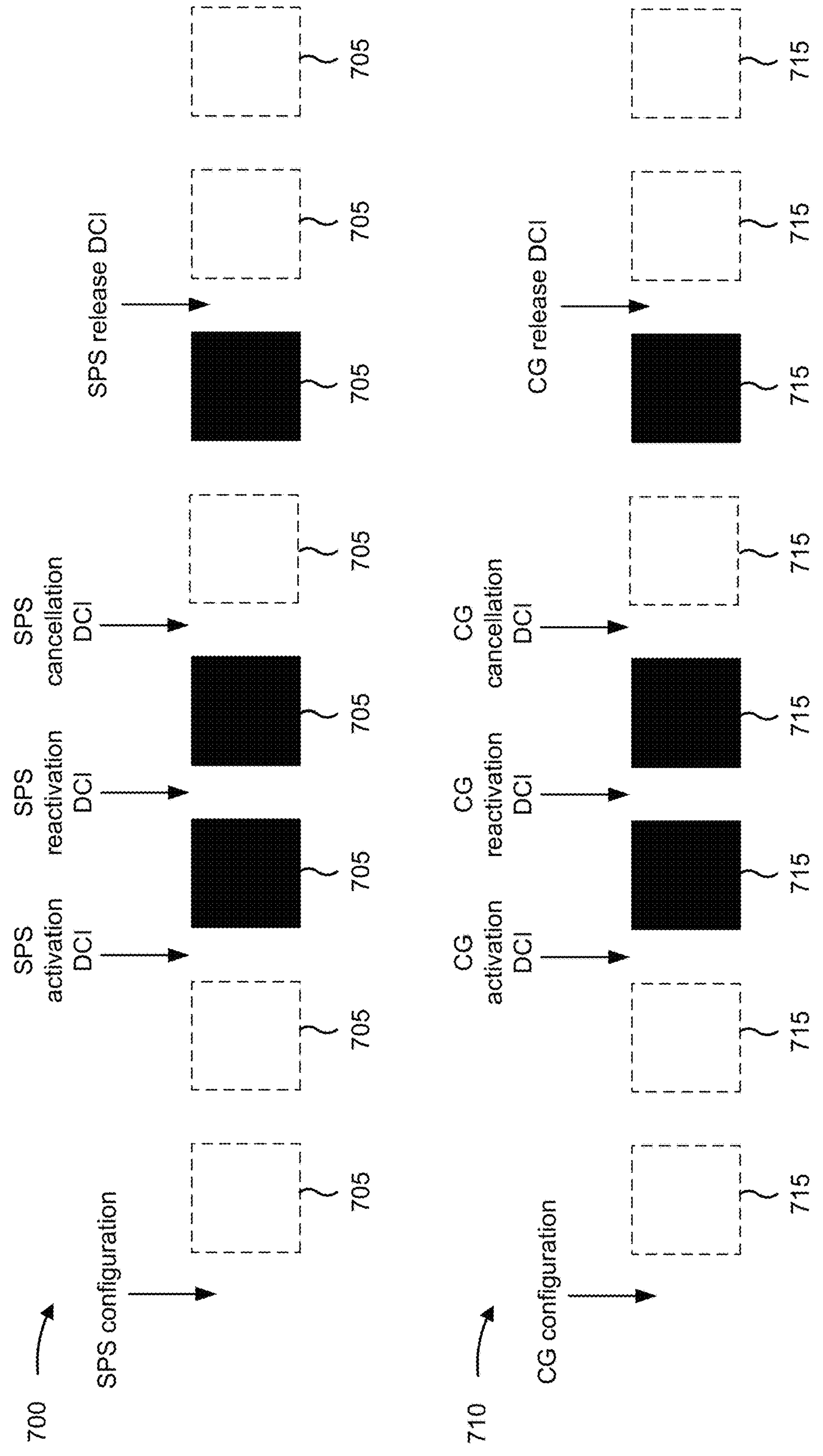
FIG. 7 is a diagram illustrating an example of downlink semi-persistent scheduling (SPS) communication and an example of uplink configured grant (CG) communication, in accordance with the present disclosure.

FIG. 7 is a diagram illustrating an example 700 of downlink semi-persistent scheduling (SPS) communication and an example 710 of uplink configured grant (CG) communication, in accordance with the present disclosure. SPS communications may include periodic downlink communications that are configured for a UE, such that a network node does not need to transmit (e.g., directly or via one or more network nodes) separate DCI to schedule each downlink communication, thereby conserving signaling overhead. CG communications may include periodic uplink communications that are configured for a UE, such that the network node does not need to transmit (e.g., directly or via one or more network nodes) separate DCI to schedule each uplink communication, thereby conserving signaling overhead.

As shown in example 700, a UE may be configured with an SPS configuration for SPS communications. For example, the UE may receive the SPS configuration via a radio resource control (RRC) message transmitted by a network node (e.g., directly to the UE or via one or more network nodes). The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 705 for the UE. The SPS configuration may also configure hybrid automatic repeat request (HARD) acknowledgement (ACK) (HARQ-ACK) feedback resources for the UE to transmit HARQ-ACK feedback for SPS PDSCH communications received in the SPS occasions 705. For example, the SPS configuration may indicate a PDSCH-to-HARQ feedback timing value, which may be referred to as a K1 value in a wireless communication specification (e.g., a 3GPP specification).

The network node may transmit SPS activation DCI to the UE (e.g., directly or via one or more network nodes) to activate the SPS configuration for the UE. The network node may indicate, in the SPS activation DCI, communication parameters, such as an MCS, a resource block (RB) allocation, and/or antenna ports, for the SPS PDSCH communications to be transmitted in the scheduled SPS occasions 705. The UE may begin monitoring the SPS occasions 705 based at least in part on receiving the SPS activation DCI. For example, beginning with a next scheduled SPS occasion 705 subsequent to receiving the SPS activation DCI, the UE may monitor the scheduled SPS occasions 705 to decode PDSCH communications using the communication parameters indicated in the SPS activation DCI. The UE may refrain from monitoring configured SPS occasions 705 prior to receiving the SPS activation DCI.

The network node may transmit SPS reactivation DCI to the UE (e.g., directly or via one or more network nodes) to change the communication parameters for the SPS PDSCH communications. Based at least in part on receiving the SPS reactivation DCI, the UE may begin monitoring the scheduled SPS occasions 705 using the communication parameters indicated in the SPS reactivation DCI. For example, beginning with a next scheduled SPS occasion 705 subsequent to receiving the SPS reactivation DCI, the UE may monitor the scheduled SPS occasions 705 to decode PDSCH communications based on the communication parameters indicated in the SPS reactivation DCI.

In some cases, such as when there is not downlink traffic to transmit to the UE, the network node may transmit SPS cancellation DCI to the UE (e.g., directly or via one or more network nodes) to temporarily cancel or deactivate one or more subsequent SPS occasions 705 for the UE. The SPS cancellation DCI may deactivate only a subsequent single SPS occasion 705 or a subsequent N SPS occasions 705 (where N is an integer). SPS occasions 705 after the one or more (e.g., N) SPS occasions 705 subsequent to the SPS cancellation DCI may remain activated. Based at least in part on receiving the SPS cancellation DCI, the UE may refrain from monitoring the one or more (e.g., N) SPS occasions 705 subsequent to receiving the SPS cancellation DCI. As shown in example 700, the SPS cancellation DCI cancels one subsequent SPS occasion 705 for the UE. After the SPS occasion 705 (or N SPS occasions) subsequent to receiving the SPS cancellation DCI, the UE may automatically resume monitoring the scheduled SPS occasions 705.

The network node may transmit SPS release DCI to the UE (e.g., directly or via one or more network nodes) to deactivate the SPS configuration for the UE. The UE may stop monitoring the scheduled SPS occasions 705 based at least in part on receiving the SPS release DCI. For example, the UE may refrain from monitoring any scheduled SPS occasions 705 until another SPS activation DCI is received by the UE. Whereas the SPS cancellation DCI may deactivate only a subsequent single SPS occasion 705 or a subsequent N SPS occasions 705, the SPS release DCI deactivates all subsequent SPS occasions 705 for a given SPS configuration for the UE until the given SPS configuration is activated again by a new SPS activation DCI.

As shown in example 710, a UE may be configured with a CG configuration for CG communications. For example, the UE may receive the CG configuration via an RRC message transmitted by a network node (e.g., directly to the UE or via one or more network nodes). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 715 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network node may transmit CG activation DCI to the UE (e.g., directly or via one or more network nodes) to activate the CG configuration for the UE. The network node may indicate, in the CG activation DCI, communication parameters, such as an MCS, an RB allocation, and/or antenna ports, for the CG physical uplink shared channel (PUSCH) communications to be transmitted in the scheduled CG occasions 715. The UE may begin transmitting in the CG occasions 715 based at least in part on receiving the CG activation DCI. For example, beginning with a next scheduled CG occasion 715 subsequent to receiving the CG activation DCI, the UE may transmit a PUSCH communication in the scheduled CG occasions 715 using the communication parameters indicated in the CG activation DCI. The UE may refrain from transmitting in configured CG occasions 715 prior to receiving the CG activation DCI.

The network node may transmit CG reactivation DCI to the UE (e.g., directly or via one or more network nodes) to change the communication parameters for the CG PUSCH communications. Based at least in part on receiving the CG reactivation DCI, the UE may begin transmitting in the scheduled CG occasions 715 using the communication parameters indicated in the CG reactivation DCI. For example, beginning with a next scheduled CG occasion 715 subsequent to receiving the CG reactivation DCI, the UE may transmit PUSCH communications in the scheduled CG occasions 715 based at least in part on the communication parameters indicated in the CG reactivation DCI.

In some cases, such as when the network node needs to override a scheduled CG communication for a higher priority communication, the network node may transmit CG cancellation DCI to the UE (e.g., directly or via one or more network nodes) to temporarily cancel or deactivate one or more subsequent CG occasions 715 for the UE. The CG cancellation DCI may deactivate only a subsequent single CG occasion 715 or a subsequent N CG occasions 715 (where N is an integer). CG occasions 715 after the one or more (e.g., N) CG occasions 715 subsequent to the CG cancellation DCI may remain activated. Based at least in part on receiving the CG cancellation DCI, the UE may refrain from transmitting in the one or more (e.g., N) CG occasions 715 subsequent to receiving the CG cancellation DCI. As shown in example 710, the CG cancellation DCI cancels one subsequent CG occasion 715 for the UE. After the CG occasion 715 (or N CG occasions) subsequent to receiving the CG cancellation DCI, the UE may automatically resume transmission in the scheduled CG occasions 715.

The network node may transmit CG release DCI to the UE (e.g., directly or via one or more network nodes) to deactivate the CG configuration for the UE. The UE may stop transmitting in the scheduled CG occasions 715 based at least in part on receiving the CG release DCI. For example, the UE may refrain from transmitting in any scheduled CG occasions 715 until another CG activation DCI is received by the UE. Whereas the CG cancellation DCI may deactivate only a subsequent single CG occasion 715 or a subsequent N CG occasions 715, the CG release DCI deactivates all subsequent CG occasions 715 for a given CG configuration for the UE until the given CG configuration is activated again by a new CG activation DCI.

As indicated above, FIG. 7 is provided as an example. Other examples may differ from what is described with respect to FIG. 7.

Figure 8:
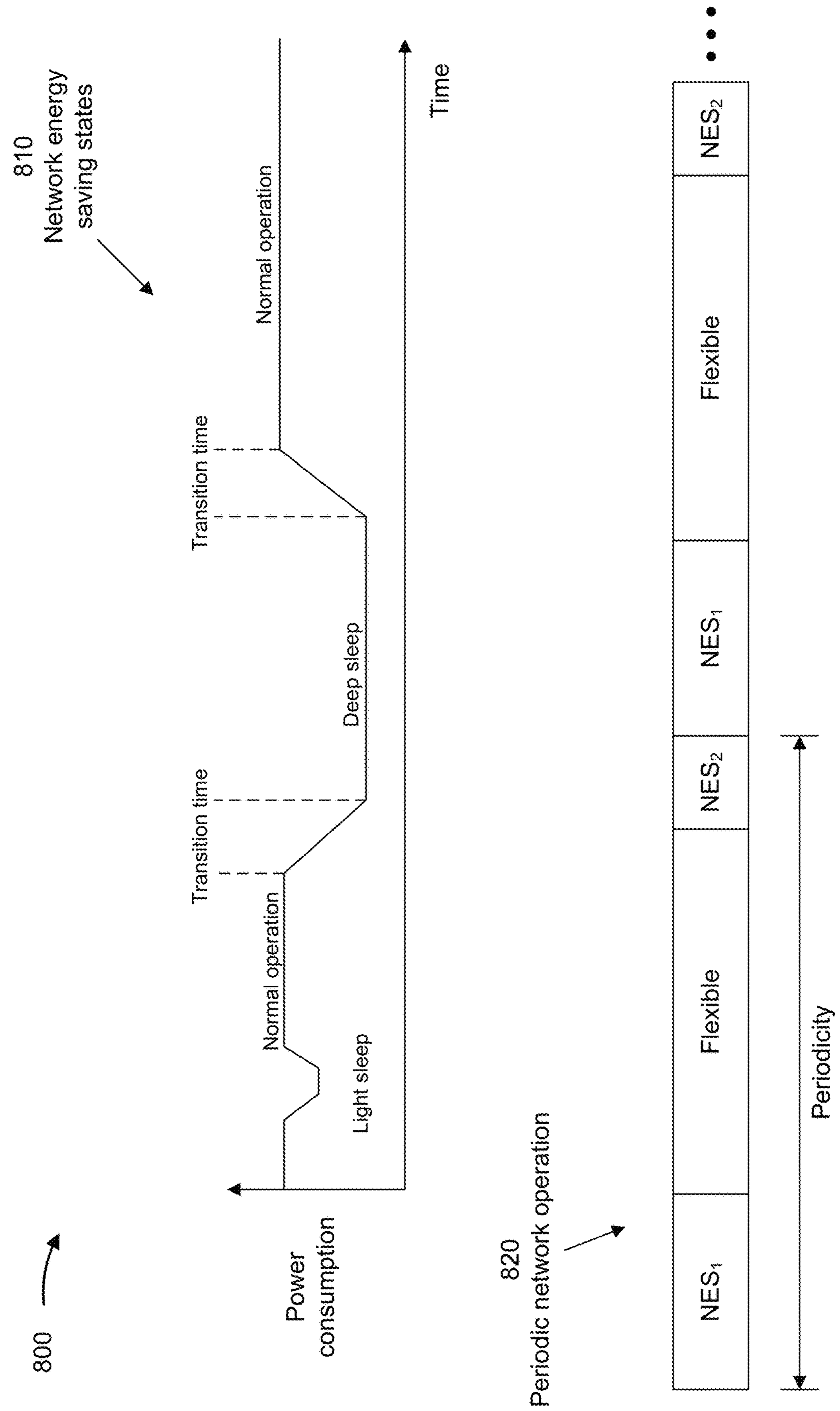
FIG. 8 is a diagram illustrating an example of network operations to reduce energy consumption in accordance with the present disclosure.

FIG. 8 is a diagram illustrating an example 800 of network operations to reduce energy consumption in accordance with the present disclosure. Network energy saving and/or network energy efficiency measures are expected to have increased importance in wireless network operations for various reasons, including climate change mitigation, environmental sustainability, and network cost reduction. For example, although NR generally offers a significant energy efficiency improvement per gigabyte over previous generations (for example, LTE), new NR use cases that demand high data rates and/or the adoption of millimeter wave frequencies may require more network sites, greater network density, more network antennas, larger bandwidths, and/or more frequency bands, which could potentially lead to a more efficient wireless network that nonetheless has higher energy requirements and/or causes more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). Most energy consumption and/or energy costs come from powering a RAN, which accounts for about half of the energy consumed by a wireless network. Accordingly, measures to increase network energy savings and/or network energy efficiency are important factors that may drive adoption and/or expansion of wireless networks.

One way to increase energy efficiency in a RAN may be to adapt network energy consumption models to achieve more efficient operation dynamically and/or semi-statically. For example, power consumption in a RAN can generally be split into a dynamic portion, in which power is consumed only when data transmission and/or reception is ongoing, and a static portion, in which power is consumed all of the time to maintain the operation of radio access devices even when data transmission and/or reception is not ongoing. Accordingly, one potential approach to improve network energy savings may be to adapt power consumption models from the network perspective by reducing relative energy consumption for downlink and/or uplink communication (for example, considering factors such as power amplifier (PA) efficiency, quantities of transceiver units (TxRUs), and/or network load, among other examples), enabling network sleep states and associated transition times, and/or defining appropriate reference parameters and/or configurations. For example, in some cases, different network energy savings (NES) states may be configured to enable granular adaptation of transmission and/or reception to reduce energy consumption using techniques in time, frequency, spatial, and/or power domains, with potential support and/or feedback from UEs and/or potential UE assistance information. However, network devices and UE may need to exchange and/or coordinate information over network interfaces, such as control configurations, communication parameters, and/or UE behavior for each NES state, which can increase configuration complexity and/or signaling overhead. This may pose challenges because techniques to reduce network energy consumption should generally be designed to avoid having a large impact on key performance indicators (KPIs) related to network and/or UE performance (for example, spectral efficiency, latency, UE power consumption, and/or complexity, among other examples).

Accordingly, as shown in FIG. 8, a network node may be configured to operate in different NES states 810 over time, where each NES state 810 may use one or more techniques to adapt transmission and/or reception in time, frequency, spatial, and/or power domains. For example, as shown in FIG. 8, the NES states 810 may include a normal operation mode (which may also be referred to as a legacy mode or a default mode) and one or more sleep modes that may be associated with a lower power consumption than the normal operation mode. In general, a network node may transition between different NES states 810 to save power and maintain network operation (for example, minimizing impact on KPIs such as spectral efficiency, capacity, user perceived throughput (UPT), latency, UE power consumption, complexity, handover performance, call drop rate, initial access performance, and/or service level agreement (SLA) assurance). Furthermore, the network node may transition between different sleep modes based on traffic demands (for example, entering a light sleep mode when traffic demands are slightly lower than usual and/or entering a deep sleep mode when traffic demands are much lower than usual), and different sleep modes may be associated with different energy saving techniques (for example, one or more antenna panels, antenna ports, and/or radio frequency (RF) chains may be turned off in the deep sleep mode but remain on in the light sleep mode). Accordingly, as shown in FIG. 8, the normal operation mode and the different sleep modes may vary in terms of power consumption and may be associated with different transition times (for example, a transition time to or from the deep sleep mode may be longer than a transition time to or from the light sleep mode).

In some cases, as described herein, an NES state 810 may generally correspond to a particular set of configurations, communication parameters, and/or UE behaviors. For example, an NES state 810 may include a set of configurations, communication parameters, and/or UE behaviors associated with one or more energy saving techniques that are implemented in the time, frequency, spatial, and/or power domain to reduce energy consumption. For example, a network node may be configured to not transmit a synchronization signal block (SSB) to reduce energy consumption in a first NES state 810 (for example, an SSB-less NES state 810), and may be configured to employ other energy saving techniques such as turning off one or more antenna panels in a second NES state 810. Furthermore, in some cases, an NES state 810 may be associated with a set of configurations, communication parameters, and/or UE behaviors associated with the normal or legacy mode of network operation. Accordingly, because one design objective in energy-efficient wireless networks is to achieve more efficient operation dynamically and/or semi-statically, a network node may configure a semi-static pattern 820 to achieve network energy savings. For example, as shown in FIG. 8, the semi-static pattern 820 (for example, configured via RRC signaling) may include a sequence of NES states 810 that the network node follows in accordance with a given periodicity (for example, in FIG. 8, the network node operates in accordance with a first NES state, shown as $NES_1$, for a first time period, then operates in a flexible mode for a second time period, then operates in accordance with a second NES state, shown as $NES_2$, for a third time period, and the pattern then repeats). In cases where the semi-static pattern 820 includes a flexible mode, the network node may operate in accordance with any suitable NES state during the time period corresponding to the flexible mode (for example, depending on current traffic conditions), and the NES state that the network node selects for the time period corresponding to the flexible mode may be dynamically indicated to served UEs. In some examples, a UE may be configured with an SPS configuration (referred to herein as a configuration for SPS) or a CG configuration (referred to herein as a configuration for a CG). As used herein, "a configuration for SPS or a CG" can refer to an SPS configuration (or part of an SPS configuration), a CG configuration (or part of a CG configuration), or a combination thereof. In some examples, a configuration for SPS or a CG may be configured for joint transmissions to or from multiple TRPs, which may improve reliability such as for critical traffic. For example, the configuration may indicate information related to decoding or transmitting data for multiple TRPs, such as a time-domain resource allocation (TDRA), a frequency-domain resource allocation (FDRA), a CORESET pool index, a TCI state, or the like. However, in some scenarios, a TRP of the multiple TRPs may dynamically change an NES state 810 (e.g., the TRP may enter or leave a deep sleep). In this situation, the TRP may not be permitted to transmit in the deep sleep. If the UE is currently communicating in accordance with the configuration (e.g., by transmitting on activated CG occasions or receiving on activated SPS occasions) without taking into account the changed NES state 810, errors may occur. However, explicitly reconfiguring the configuration (such as by deactivating or releasing a current configuration for SPS or the CG and configuring another configuration for SPS or CG), may incur delay and signaling overhead.

Some techniques described herein provide configuration of an adaptive SPS or CG, such as to support dynamic network energy saving operations. For example, a UE may be configured with a configuration for SPS or CG. The configuration may include a first set of parameters (e.g., a first set of SPS parameters or a first set of CG parameters) for a first state (e.g., a first NES state) of a TRP and a second set of parameters (e.g., a second set of SPS parameters or a second set of CG parameters) for a second state (e.g., a second NES state) of the TRP. The UE may communicate with the TRP based on the configuration. For example, the UE may use the first set of parameters while the TRP is in the first state. As another example, the UE may use the second set of parameters while the TRP is in the second state. Providing different sets of parameters (e.g., SPS parameters or CG parameters) for different states of the network node may conserve signaling overhead and reduce delay relative to explicitly reconfiguring an SPS configuration or CG configuration each time the state of the network node changes.

As indicated above, FIG. 8 is provided as an example. Other examples may differ from what is described with regard to FIG. 8.

Figure 9:
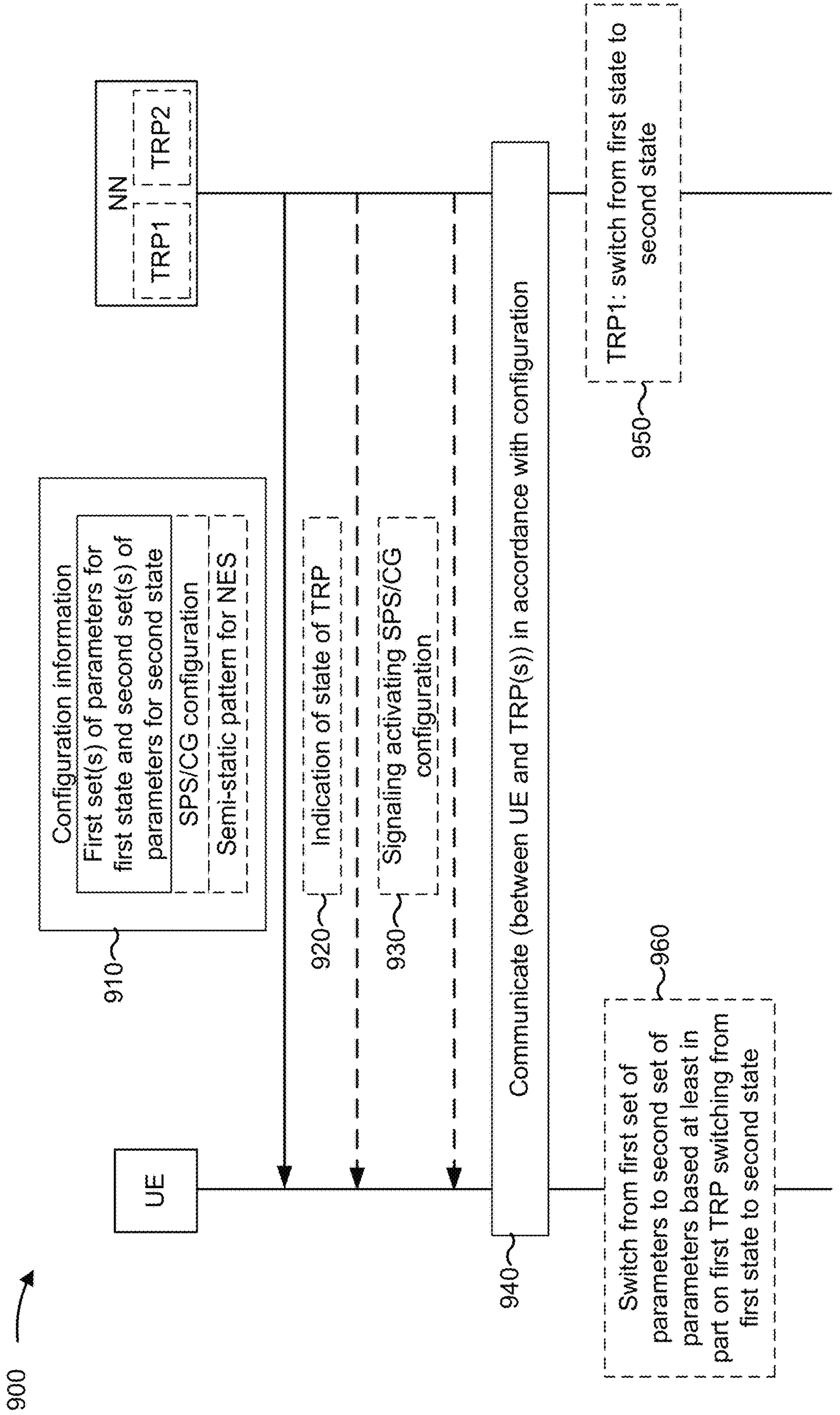
FIG. 9 is a diagram illustrating an example of signaling associated with adaptive configured communication for network energy saving operations, in accordance with the present disclosure.

FIG. 9 is a diagram illustrating an example 900 of signaling associated with adaptive configured communication for network energy saving operations, in accordance with the present disclosure. Example 900 includes a UE (e.g., UE 120) and a network node (e.g., network node 110, CU 310, DU 330). As shown, the network node is associated with a first TRP and a second TRP (e.g., network node 110, DU 330, RU 340, TRP 605, TRP 505, TRP 435). In some aspects, the network node may output a communication. For example, the network node may transmit the communication (e.g., directly) or may provide the communication for transmission by a TRP (e.g., the first TRP or the second TRP). In some aspects, the network node may obtain a communication. For example, the network node may receive the communication (e.g., directly) or may receive the communication from a TRP (e.g., the first TRP or the second TRP).

As shown by reference number 910, the network node may output, and the UE may receive, configuration information. For example, the UE may receive the configuration information via RRC signaling (e.g., one or more RRC messages), medium access control (MAC) signaling (e.g., one or more MAC messages), downlink control information (DCI) (e.g., one or more DCI messages), or a combination thereof.

In some aspects, the configuration information may include a configuration for SPS, such as one or more of the parameters of an SPS configuration described with regard to FIG. 7. Additionally, or alternatively, the configuration information may include a configuration for a CG, such as one or more of the parameters of a CG configuration described with regard to FIG. 7. For example, the configuration information may include an SPS configuration, a subset of an SPS configuration, multiple SPS configurations, or a combination thereof. In some aspects, the SPS configuration may indicate that the SPS configuration is associated with the network node (e.g., the first TRP and/or the second TRP). For example, the configuration information may include a CG configuration, a subset of a CG configuration, multiple CG configurations, or a combination thereof. In some aspects, the CG configuration may indicate that the CG configuration is associated with the network node (e.g., the first TRP and/or the second TRP).

In some aspects, the configuration information may include a configuration associated with a state of one or more TRPs. For example, the configuration information may indicate a semi-static pattern (e.g., semi-static pattern 820) for one or more NES states of a TRP. As another example, the configuration information may indicate a first semi-static pattern for one or more NES states of a first TRP and a second semi-static pattern for one or more NES states of a second TRP. As yet another example, the configuration information may indicate a first semi-static pattern for first NES states and second NES states of a first TRP and a second semi-static pattern for first NES states and second NES states of a second TRP. As yet another example, the configuration information may indicate a semi-static pattern that indicates states of multiple TRPs (e.g., a single semi-static pattern may indicate a combined state of the first TRP and the second TRP, such as "first TRP=$NES_1$ and second TRP=$NES_2$" at a given time).

The configuration information may include a configuration indicating a first set of parameters associated with a first state of the first TRP and a second set of parameters associated with a second state of the first TRP. For example, the configuration may be part of the RRC configuration of the SPS or the CG. In some aspects, the first set of parameters and the second set of parameters may include a parameter configurable as part of an SPS configuration, a CG configuration, or an activation of an SPS configuration or a CG configuration. In some aspects, a parameter, of the first set of parameters or the second set of parameters, may include a modulation and coding scheme (MCS) value, a delta MCS (indicating a change of MCS from a baseline or default value), a rank indicator, a power control value, a combination thereof, or another parameter associated with transmission or reception on SPS or CG configurations. In some aspects, the second set of parameters may be configured using an offset relative to the first set of parameters. In some aspects, the second set of parameters and the first set of parameters may each be configured as respective sets of explicit values. In some aspects, the configuration of the first set of parameters and/or the second set of parameters may indicate a TRP with which the configuration (e.g., the first set of parameters and/or the second set of parameters) is associated. For example, the configuration may indicate a TCI state and a CORESET pool index of a TRP with which the first set of parameters and/or the second set of parameters are associated. In some aspects, the first set of parameters or the second set of parameters may indicate whether or not to transmit or receive at a given time (e.g., whether to skip a CG or SPS occasion due to, for example, the corresponding TRP being in a deep sleep state). Thus, the first set of parameters or the second set of parameters may be said to be "for the CG or the SPS" in that the first set of parameters or the second set of parameters indicate one or more parameters for transmitting or receiving SPS or CG communications, and/or indicate whether to utilize an SPS occasion or a CG occasion.

In some aspects, the configuration may indicate multiple sets of parameters per TRP, of the first TRP and the second TRP. For example, the configuration may indicate a first set of parameters and a second set of parameters for a first TRP, and a third set of parameters for a first state and a second set of parameters for a second state for a second TRP. Thus, the UE can dynamically apply one or more sets of parameters according to a current state of the first TRP and the second TRP without being explicitly reconfigured at each state change of either of the first TRP or the second TRP. In some aspects, the configuration of the set(s) of parameters may indicate multiple sets of parameters, where each set of parameters of the multiple sets of parameters is associated with a respective combined state of the first TRP and the second TRP. A combined state of the first TRP and the second TRP at a given time collectively identifies a state of the first TRP and a state of the second TRP at the given time. For example, a configuration of a set of parameters may indicate, for one or more potential combined states of the first TRP and the second TRP, a transmission mode for the UE, as illustrated in Table 1, below. In Table 1, NES1 is a first NES state and NES2 is a second NES state, where in NES2, the corresponding TRP is in a deep sleep with no transmission allowed:

TABLE 1

| TRP1 NES state | TRP2 NES state | Transmission mode |
|---|---|---|
| Legacy | Legacy | M-TRP |
| Legacy | NES1 | M-TRP |
| Legacy | NES2 | Single TRP 1 |
| NES1 | Legacy | M-TRP |
| NES1 | NES1 | M-TRP |
| NES1 | NES2 | Single TRP 1 |
| NES2 | Legacy | Single TRP 2 |
| NES2 | NES1 | Single TRP 2 |
| NES2 | NES2 | Skipped occasion |

As shown in Table 1, when both TRPs are active (i.e., not in the NES2 state), the UE transmits or receives in multi-TRP (M-TRP) mode (such as using TCI states associated with both TRPs). When only one TRP is active (i.e., only one TRP is not in the NES2 state), the UE transmits or receives in a single TRP mode corresponding to the active TRP (such as using a TCI state associated with the active TRP). When both TRPs are in deep sleep, the UE skips a CG or SPS occasion occurring while both TRPs are in deep sleep.

As shown by reference number 920, in some aspects, the network node may output, and the UE may receive, an indication of a state of a TRP. For example, the indication may indicate that a state of a TRP (e.g., a TRP that transmitted the indication or another TRP) is to change from a first state to a second state or from a second state to a first state. In some aspects, the UE may not receive such an indication. For example, the network node may provide one or more semi-static patterns that indicate states of the first TRP and the second TRP.

As shown by reference number 930, in some aspects, the network node may output, and the UE may receive, signaling activating the configuration for SPS or the configuration for CG. The signaling may include, for example, RRC signaling, MAC signaling, or DCI. This is described above in more detail in connection with FIG. 7.

As shown by reference number 940, the UE may communicate with the network node (e.g., the first TRP, the second TRP, or a combination thereof) in accordance with the configuration for SPS or CG. For example, the UE may communicate with the first TRP using a set of parameters, of the configuration, corresponding to a current state of the first TRP. As another example, the UE may communicate with the second TRP using a set of parameters, of the configuration, corresponding to a current state of the second TRP. As yet another example, the UE may communicate with at least one of the first TRP or the second TRP based at least in part on a combined state of the first TRP and the second TRP and in accordance with the configuration. For example, the configuration may indicate a set of parameters corresponding to the combined state, or the UE may identify the set of parameters using respective sets of parameters corresponding to individual states of the first TRP and the second TRP. The UE may use the set of parameters to communicate with the first TRP and/or the second TRP (depending on whether the first TRP is active or in a deep sleep and the second TRP is active or in a deep sleep).

As shown by reference number 950, the first TRP may switch from the first state to the second state. For example, the first TRP may switch from a first NES state to a second NES state, as described herein. As shown by reference number 960, the UE may switch from the first set of parameters (configured for the first state) to the second set of parameters (configured for the second state) based at least in part on the first TRP switching from the first state to the second state. For example, the UE may adjust a transmission or reception from being performed using the first set of parameters to being performed using the second set of parameters. In some aspects, the UE may autonomously determine that the first TRP has switched from the first state to the second state by reference to a configured schedule of states for the first TRP. As another example, the UE may autonomously switch between sets of parameters in accordance with the configured semi-static pattern (such that a set of parameters corresponding to a current state of the first TRP is always in use at the UE). As another example, the UE may determine that the first TRP has switched from the first state to the second state by reference to an indication, received from the first TRP or the second TRP, indicating that the first TRP has switched from the first state to the second state. Thus, the UE may use an adaptive SPS configuration or CG configuration for communication with one or more TRPs, such that the one or more TRPs can dynamically adjust their states (e.g., NES states), which enables improved flexibility for NES operation and reduced overhead relative to explicitly reconfiguring the SPS configuration or CG configuration each time the NES state of a TRP changes.

In some aspects, the UE may switch from the first set of parameters to the second parameters (or from the second set of parameters to the first set of parameters) in a next transmission or reception occasion (e.g., a next SPS occasion or a next CG occasion) after the first TRP switches from the first state to the second state. For example, the UE may receive an indication that the first TRP has switched from the first state to the second state, or may determine according to the semi-static pattern that the first TRP has switched from the first state to the second state. The UE may, in a next transmission or reception occasion, use the second set of parameters for transmission or reception in the next transmission or reception occasion. In some other aspects, the UE may switch from the first set of parameters to the second set of parameters a configured number of transmission or reception occasions after the first TRP switches from the first state to the second state (or the UE is indicated of such a switch). In the above example, (in which the UE switches to the second set of parameters in the next transmission or reception occasion after the switch from the first state to the second state occurs or is indicated to the UE), the configured number of transmission or reception occasions may be 0 (such that the UE switches in a next transmission or reception occasion after the switch from the first state to the second state occurs or is indicated to the UE). In some other aspects, the UE may be configured with a number N indicating a number of transmission or reception occasions, after the switch from the first state to the second state occurs or is indicated to the UE, after which the second set of parameters should be used for transmission or reception. For example, if Nis 1, the UE may use the second set of parameters for transmission or reception in a first transmission or reception occasion occurring after a next transmission or reception occasion after the switch from the first state to the second state occurs or is indicated to the UE.

As indicated above, FIG. 9 is provided as an example. Other examples may differ from what is described with regard to FIG. 9.

Figure 10:
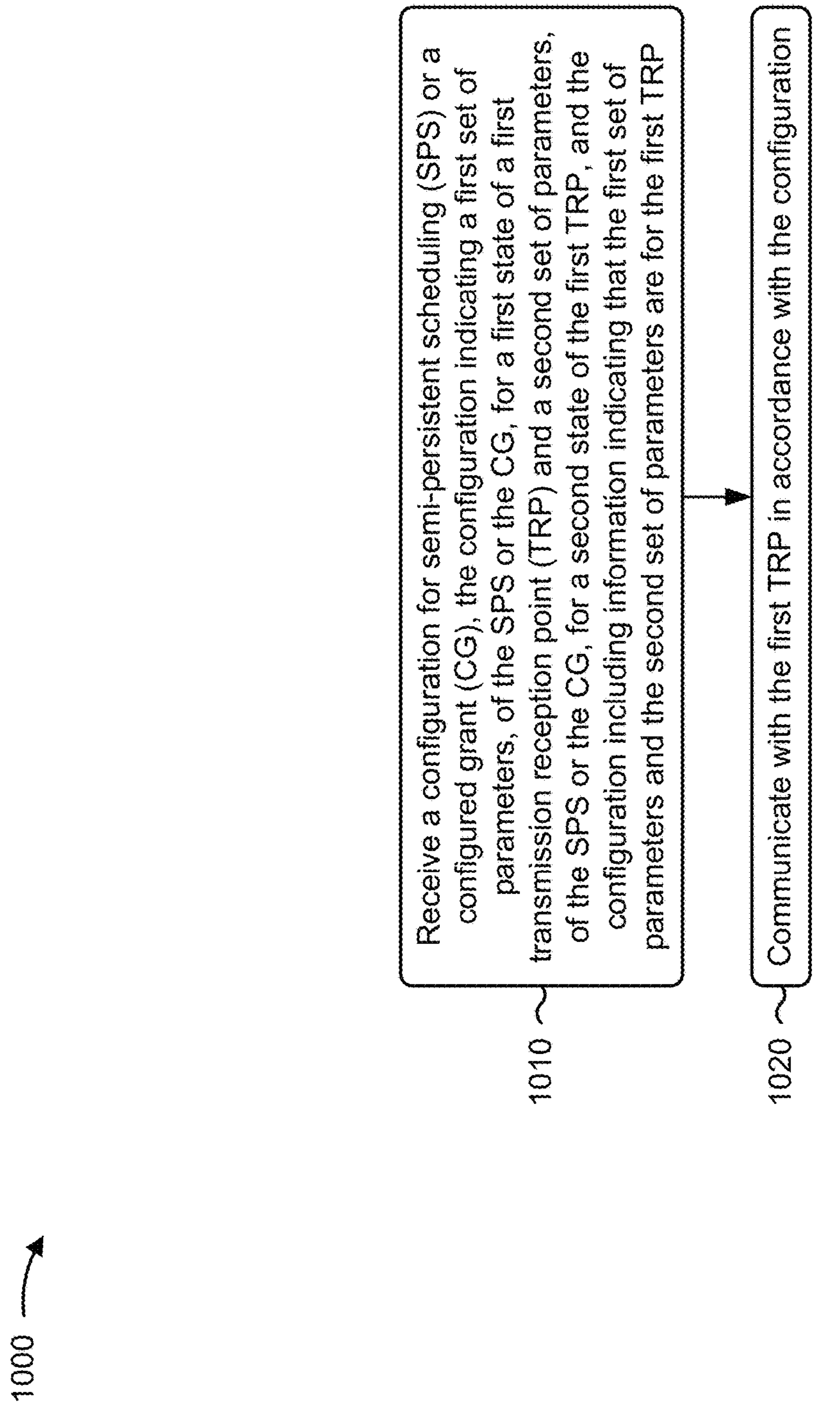
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with techniques for adaptive configured communication for network energy saving operations.

As shown in FIG. 10, in some aspects, process 1000 may include receiving a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP (block 1010). For example, the UE (e.g., using reception component 1202 and/or communication manager 1206, depicted in FIG. 12) may receive a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP, as described above, for example, in connection with reference number 910 of FIG. 9.

As further shown in FIG. 10, in some aspects, process 1000 may include communicating with the first TRP in accordance with the configuration (block 1020). For example, the UE (e.g., using reception component 1202, transmission component 1204, and/or communication manager 1206, depicted in FIG. 12) may communicate with the first TRP in accordance with the configuration, as described above, for example, in connection with reference number 940 of FIG. 9.

Process 1000 may include additional aspects, such as any single aspect or any combination of aspects described below and/or in connection with one or more other processes described elsewhere herein.

In a first aspect, the first set of parameters or the second set of parameters include at least one of a modulation and coding scheme parameter, a delta modulation and coding scheme parameter, or a rank parameter.

In a second aspect, alone or in combination with the first aspect, the first state is a first network energy saving state and the second state is a second network energy saving state.

In a third aspect, alone or in combination with one or more of the first and second aspects, the information includes at least one of a transmission configuration indicator state indication, or a control resource set pool index.

In a fourth aspect, alone or in combination with one or more of the first through third aspects, the configuration indicates a third set of parameters for a first state of a second TRP and a fourth set of parameters for a second state of the second TRP.

In a fifth aspect, alone or in combination with one or more of the first through fourth aspects, the communication with the first TRP in accordance with the configuration further comprises communicating with at least one of the first TRP or the second TRP based at least in part on a combined state of the first TRP and the second TRP and in accordance the configuration.

In a sixth aspect, alone or in combination with one or more of the first through fifth aspects, process 1000 includes switching from the first set of parameters to the second set of parameters for the communication with the first TRP based at least in part on the first TRP switching from the first state to the second state.

In a seventh aspect, alone or in combination with one or more of the first through sixth aspects, the switching from the first set of parameters to the second set of parameters further comprises switching from the first set of parameters to the second set of parameters in a next transmission or reception occasion after the first TRP switches from the first state to the second state.

In an eighth aspect, alone or in combination with one or more of the first through seventh aspects, the switching from the first set of parameters to the second set of parameters further comprises switching from the first set of parameters to the second set of parameters a configured number of transmission or reception occasions after the first TRP switches from the first state to the second state.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
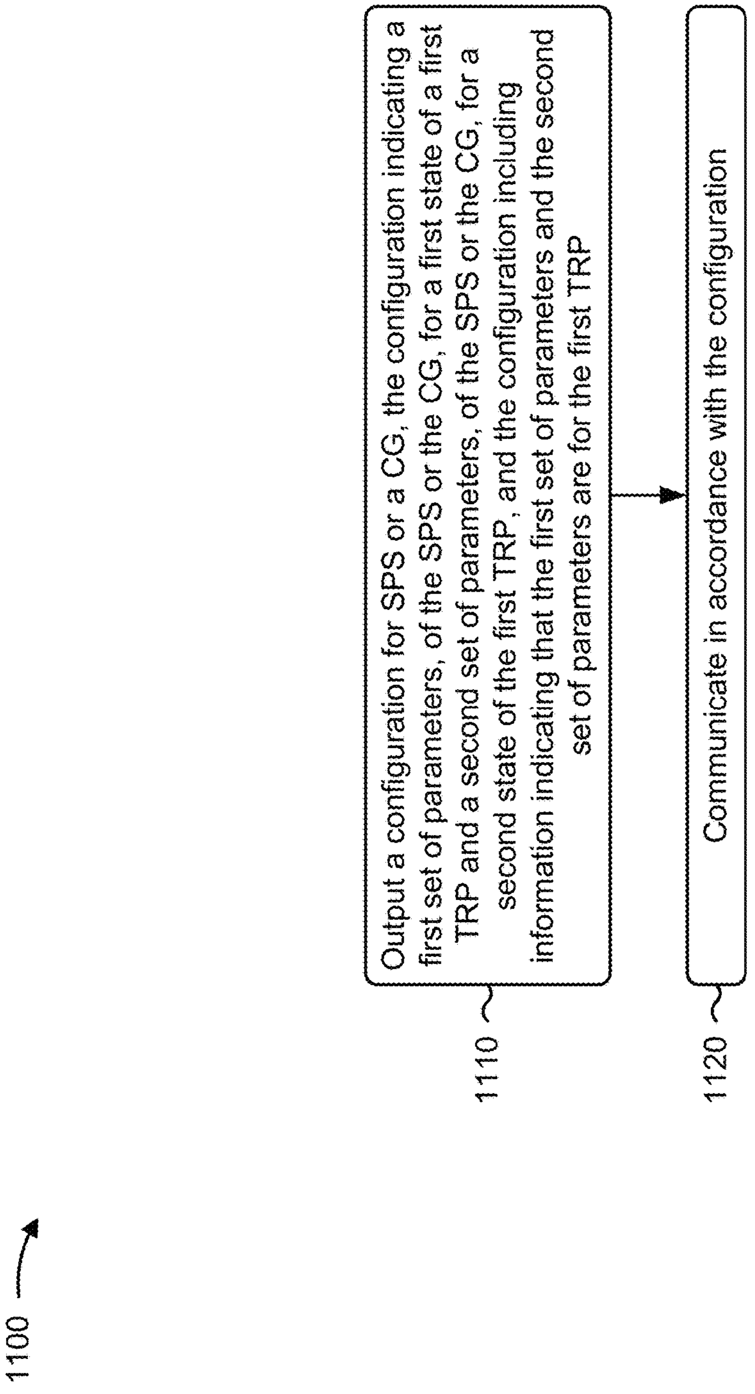
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with techniques for adaptive configured communication for network energy saving operations.

As shown in FIG. 11, in some aspects, process 1100 may include outputting a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP (block 1110). For example, the network node (e.g., using communication manager 1306, depicted in FIG. 13) may output a configuration for SPS or a CG, the configuration indicating a first set of parameters, of the SPS or the CG, for a first state of a TRP and a second set of parameters, of the SPS or the CG, for a second state of the first TRP, and the configuration including information indicating that the first set of parameters and the second set of parameters are for the first TRP, as described above, for example, in connection with reference number 910 of FIG. 9.

As further shown in FIG. 11, in some aspects, process 1100 may include communicating in accordance with the configuration (block 1120). For example, the network node (e.g., using reception component 1302, transmission component 1304, and/or communication manager 1306, depicted in FIG. 13) may communicate in accordance with the configuration, as described above, for example, in connection with reference number 940 of FIG. 9.

Process 1100 may include additional aspects, such as any single aspect or any combination of aspects described below and/or in connection with one or more other processes described elsewhere herein.

In a first aspect, the first set of parameters or the second set of parameters include at least one of a modulation and coding scheme parameter, a delta modulation and coding scheme parameter, or a rank parameter.

In a second aspect, alone or in combination with the first aspect, the first state is a first network energy saving state and the second state is a second network energy saving state.

In a third aspect, alone or in combination with one or more of the first and second aspects, the information includes at least one of a transmission configuration indicator state indication, or a control resource set pool index.

In a fourth aspect, alone or in combination with one or more of the first through third aspects, the configuration indicates a third set of parameters for a first state of a second TRP and a fourth set of parameters for a second state of the second TRP.

In a fifth aspect, alone or in combination with one or more of the first through fourth aspects, the communication with the first TRP in accordance with the configuration further comprises communicating based at least in part on a combined state of the first TRP and the second TRP and in accordance the configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
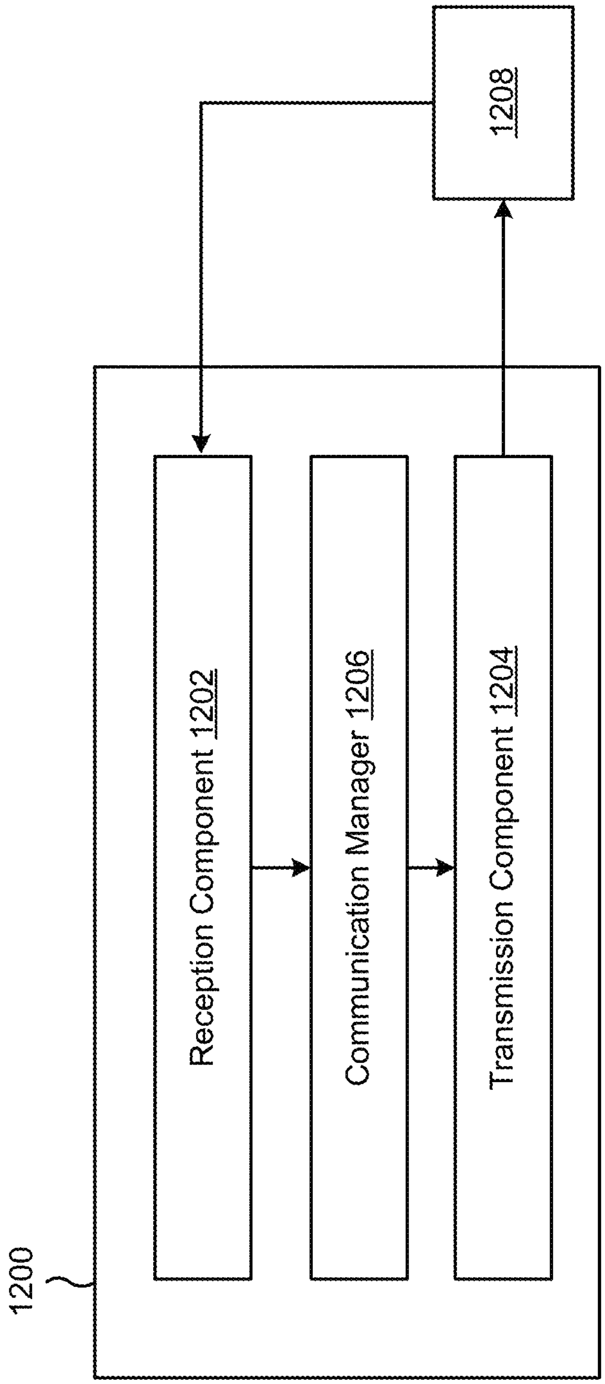
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208 (such as a UE, a base station, or another wireless communication device) using the reception component 1202 and the transmission component 1204.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The reception component 1202 and/or the transmission component 1204 may communicate with the first TRP in accordance with the configuration.

The communication manager 1206 may switch from the first set of parameters to the second set of parameters for the communication with the first TRP based at least in part on the first TRP switching from the first state to the second state.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
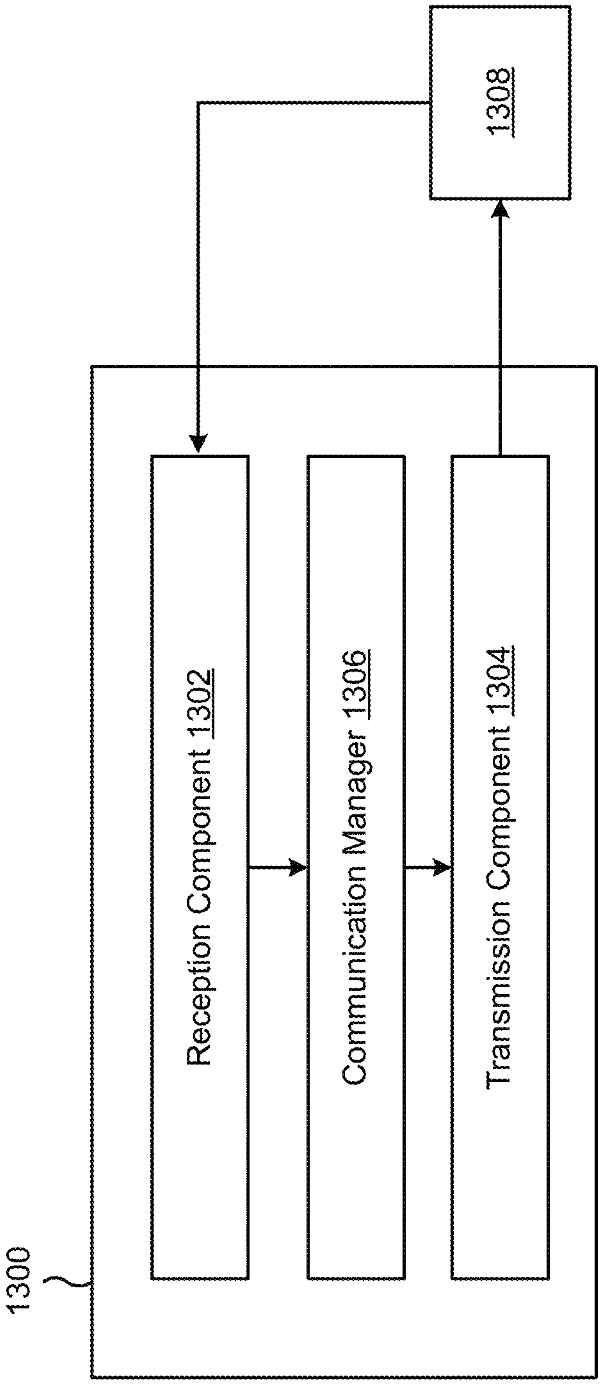
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308 (such as a UE, a base station, or another wireless communication device) using the reception component 1302 and the transmission component 1304.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may output a configuration for SPS or a CG, the configuration indicating a first set of parameters, of the SPS or the CG, for a first state of a first TRP and a second set of parameters, of the SPS or the CG, for a second state of the first TRP, and the configuration including information indicating that the first set of parameters and the second set of parameters are for the first TRP. The reception component 1302 and/or the transmission component 1304 may communicate in accordance with the configuration.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a configuration for semi-persistent scheduling (SPS) or a configured grant (CG), the configuration indicating a first set of parameters, of the SPS or the CG, for a first state of a first transmission reception point (TRP) and a second set of parameters, of the SPS or the CG, for a second state of the first TRP, and the configuration including information indicating that the first set of parameters and the second set of parameters are for the first TRP; and communicating with the first TRP in accordance with the configuration.

Aspect 2: The method of Aspect 1, wherein the first set of parameters or the second set of parameters include at least one of: a modulation and coding scheme parameter, a delta modulation and coding scheme parameter, or a rank parameter.

Aspect 3: The method of any of Aspects 1-2, wherein the first state is a first network energy saving state and the second state is a second network energy saving state.

Aspect 4: The method of any of Aspects 1-3, wherein the information includes at least one of: a transmission configuration indicator state indication, or a control resource set pool index.

Aspect 5: The method of any of Aspects 1-4, wherein the configuration indicates a third set of parameters for a first state of a second TRP and a fourth set of parameters for a second state of the second TRP.

Aspect 6: The method of Aspect 5, wherein the communication with the first TRP in accordance with the configuration further comprises communicating with at least one of the first TRP or the second TRP based at least in part on a combined state of the first TRP and the second TRP and in accordance the configuration.

Aspect 7: The method of any of Aspects 1-6, further comprising switching from the first set of parameters to the second set of parameters for the communication with the first TRP based at least in part on the first TRP switching from the first state to the second state.

Aspect 8: The method of Aspect 7, wherein the switching from the first set of parameters to the second set of parameters further comprises switching from the first set of parameters to the second set of parameters in a next transmission or reception occasion after the first TRP switches from the first state to the second state.

Aspect 9: The method of Aspect 7, wherein the switching from the first set of parameters to the second set of parameters further comprises switching from the first set of parameters to the second set of parameters a configured number of transmission or reception occasions after the first TRP switches from the first state to the second state.

Aspect 10: A method of wireless communication performed by a network node, comprising: outputting a configuration for semi-persistent scheduling (SPS) or a configured grant (CG), the configuration indicating a first set of parameters, of the SPS or the CG, for a first state of a first transmission reception point (TRP) and a second set of parameters, of the SPS or the CG, for a second state of the first TRP, and the configuration including information indicating that the first set of parameters and the second set of parameters are for the first TRP; and communicating in accordance with the configuration.

Aspect 11: The method of Aspect 10, wherein the first set of parameters or the second set of parameters include at least one of: a modulation and coding scheme parameter, a delta modulation and coding scheme parameter, or a rank parameter.

Aspect 12: The method of any of Aspects 10-11, wherein the first state is a first network energy saving state and the second state is a second network energy saving state.

Aspect 13: The method of any of Aspects 10-12, wherein the information includes at least one of: a transmission configuration indicator state indication, or a control resource set pool index.

Aspect 14: The method of any of Aspects 10-13, wherein the configuration indicates a third set of parameters for a first state of a second TRP and a fourth set of parameters for a second state of the second TRP.

Aspect 15: The method of Aspect 14, wherein the communication with the first TRP in accordance with the configuration further comprises communicating based at least in part on a combined state of the first TRP and the second TRP and in accordance the configuration.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more antennas; and a processing system that includes one or more processors and one or more memories that store code for the one or more processors, the processing system configured to cause the UE to:

receive a semi-persistent scheduling (SPS) configuration indicating a first set of parameters for a first network energy saving state of a first transmission reception point (TRP), a second set of parameters for a second network energy saving state of the first TRP, a third set of parameters for the first network energy saving state of a second TRP, and a fourth set of parameters for the second network energy saving state of the second TRP, wherein the SPS configuration indicates, for the first TRP that is configured to operate according to a sequence of network energy saving states that follow a periodicity, the sequence of network energy saving states including at least the first network energy saving state for a first time period and the second network energy saving state for a second time period, wherein the SPS configuration includes information indicating that the first set of parameters and the second set of parameters are for the first TRP, and wherein the SPS configuration indicates that a SPS occasion, occurring while the first TRP and the second TRP are in the second network energy saving state, is a skipped occasion; and communicate with at least one of the first TRP or the second TRP in accordance with the SPS configuration.

2. The UE of claim 1, wherein the first set of parameters or the second set of parameters include at least one of:

a modulation and coding scheme parameter, a delta modulation and coding scheme parameter, or a rank parameter.

3. The UE of claim 1, wherein the information includes at least one of:

a transmission configuration indicator state indication, or a control resource set pool index.

4. The UE of claim 1, wherein the one or more processors, to communicate with at least one of the first TRP or the second TRP in accordance with the SPS configuration, are configured to communicate with at least one of the first TRP or the second TRP based at least in part on a combined state of the first TRP and the second TRP and in accordance with the SPS configuration.

5. The UE of claim 1, wherein the one or more processors are further configured to switch from the first set of parameters to the second set of parameters for a communication with the first TRP based at least in part on the first TRP switching from the first network energy saving state to the second network energy saving state.

6. The UE of claim 5, wherein the one or more processors, to switch from the first set of parameters to the second set of parameters, are configured to switch from the first set of parameters to the second set of parameters in a next transmission or reception occasion after the first TRP switches from the first network energy saving state to the second network energy saving state.

7. The UE of claim 5, wherein the one or more processors, to switch from the first set of parameters to the second set of parameters, are configured to switch from the first set of parameters to the second set of parameters a configured number of transmission or reception occasions after the first TRP switches from the first network energy saving state to the second network energy saving state.

8. The UE of claim 1, wherein a sequence of network energy saving states for the first TRP comprises a semi-static pattern that indicates states for the first TRP, including the first network energy saving state and the second network energy saving state.

9. The UE of claim 1, wherein, when the first TRP is in the second network energy saving state, the first TRP is in a sleep state.

10. The UE of claim 1, wherein the one or more processors, to communicate with at least one of the first TRP or the second TRP in accordance with the SPS configuration, are configured to:

communicate in multi-TRP (M-TRP) mode when the first TRP and the second TRP are in the first network energy saving state.

11. The UE of claim 1, wherein the one or more processors, to communicate with at least one of the first TRP or the second TRP in accordance with the SPS configuration, are configured to:

communicate in a single TRP mode corresponding to the second TRP when the first TRP is in the second network energy saving state and the second TRP is not in the second network energy saving state.

12. The UE of claim 1, wherein the one or more processors, to communicate with at least one of the first TRP or the second TRP in accordance with the SPS configuration, are configured to:

communicate in a single TRP mode corresponding to the first TRP when the second TRP is in the second network energy saving state and the first TRP is not in the second network energy saving state.

13. A network node for wireless communication, comprising:

one or more memories; and one or more antennas; and a processing system that includes one or more processors and one or more memories that store code for the one or more processors, the processing system configured to cause the network node to:

transmit radio resource control (RRC) signaling configuring a sequence of network energy saving states that follow a periodicity, the sequence of network energy saving states including a first network energy saving state for a first time period and a second network energy saving state for a second time period;

transmit a semi-persistent scheduling (SPS) configuration indicating a first set of parameters for the first network energy saving state of a first transmission reception point (TRP), a second set of parameters for the second network energy saving state of the first TRP, a third set of parameters for the first network energy saving state of a second TRP, and a fourth set of parameters for the second network energy saving state of the second TRP, wherein the SPS configuration includes information indicating that the first set of parameters and the second set of parameters are for the first TRP, and wherein the SPS configuration indicates that a SPS occasion, occurring while the first TRP and the second TRP are in the second network energy saving state, is a skipped occasion; and communicate in accordance with the SPS configuration.

14. The network node of claim 13, wherein the first set of parameters or the second set of parameters include at least one of:

a modulation and coding scheme parameter, a delta modulation and coding scheme parameter, or a rank parameter.

15. The network node of claim 13, wherein the information includes at least one of:

a transmission configuration indicator state indication, or a control resource set pool index.

16. The network node of claim 13, wherein a communication with at least one of the first TRP or the second TRP in accordance with the SPS configuration further comprises a communication based at least in part on a combined state of the first TRP and the second TRP and in accordance with the SPS configuration.

17. The network node of claim 13, wherein a sequence of network energy saving states for the first TRP comprises a semi-static pattern that indicates states for the first TRP, including the first network energy saving state and the second network energy saving state.

18. A method of wireless communication performed by a user equipment (UE), comprising:

receiving a semi-persistent scheduling (SPS) configuration indicating a first set of parameters for a first network energy saving state of a first transmission reception point (TRP), a second set of parameters for a second network energy saving state of the first TRP, a third set of parameters for the first network energy saving state of a second TRP, and a fourth set of parameters for the second network energy saving state of the second TRP, wherein the SPS configuration indicates, for the first TRP configured to operate according to a sequence of network energy saving states that follow a periodicity, at least the first network energy saving state for a first time period and the second network energy saving state for a second time period, wherein the SPS configuration includes information indicating that the first set of parameters and the second set of parameters are for the first TRP, wherein the SPS configuration indicates that a SPS occasion, occurring while the first TRP and the second TRP are in the second network energy saving state, is a skipped occasion; and communicating with at least one of the first TRP or the second TRP in accordance with the SPS configuration.

19. The method of claim 18, wherein the first set of parameters or the second set of parameters include at least one of:

a modulation and coding scheme parameter, a delta modulation and coding scheme parameter, or a rank parameter.

20. The method of claim 18, wherein the information includes at least one of:

a transmission configuration indicator state indication, or a control resource set pool index.

21. The method of claim 18, wherein communicating with at least one of the first TRP or the second TRP in accordance with the SPS configuration comprises communicating with at least one of the first TRP or the second TRP based at least in part on a combined state of the first TRP and the second TRP and in accordance with the SPS configuration.

22. The method of claim 18, further comprising switching from the first set of parameters to the second set of parameters for a communication with the first TRP based at least in part on the first TRP switching from the first network energy saving state to the second network energy saving state.

23. The method of claim 22, wherein the switching from the first set of parameters to the second set of parameters further comprises switching from the first set of parameters to the second set of parameters in a next transmission or reception occasion after the first TRP switches from the first network energy saving state to the second network energy saving state.

24. The method of claim 22, wherein the switching from the first set of parameters to the second set of parameters further comprises switching from the first set of parameters to the second set of parameters a configured number of transmission or reception occasions after the first TRP switches from the first network energy saving state to the second network energy saving state.

25. The method of claim 18, wherein a sequence of network energy saving states for the first TRP comprises a semi-static pattern that indicates states for the first TRP, including the first network energy saving state and the second network energy saving state.

26. A method of wireless communication performed by a network node, comprising:

transmitting radio resource control (RRC) signaling configuring a sequence of network energy saving states that follow a periodicity, the sequence of network energy saving states including a first network energy saving state for a first time period and a second network energy saving state for a second time period;

transmitting a semi-persistent scheduling (SPS) configuration indicating a first set of parameters for the first network energy saving state of a first transmission reception point (TRP), a second set of parameters for the second network energy saving state of the first TRP, a third set of parameters for the first network energy saving state of a second TRP, and a fourth set of parameters for the second network energy saving state of the second TRP, wherein the SPS configuration includes information indicating that the first set of parameters and the second set of parameters are for the first TRP, and wherein the SPS configuration indicates that a SPS occasion, occurring while the first TRP and the second TRP are in the second network energy saving state, is a skipped occasion; and communicating in accordance with the SPS configuration.

27. The method of claim 26, wherein the first set of parameters or the second set of parameters include at least one of:

a modulation and coding scheme parameter, a delta modulation and coding scheme parameter, or a rank parameter.

28. The method of claim 26, wherein the information includes at least one of:

a transmission configuration indicator state indication, or a control resource set pool index.

29. The method of claim 26, wherein a communication with at least one of the first TRP or the second TRP in accordance with the SPS configuration further comprises a communication based at least in part on a combined state of the first TRP and the second TRP and in accordance with the SPS configuration.

30. The method of claim 26, wherein a sequence of network energy saving states for the first TRP comprises a semi-static pattern that indicates states for the first TRP, including the first network energy saving state and the second network energy saving state.

* * * * *